June 5, 1962 L. W. HURT 3,037,273
METHOD OF MAKING EXPANSION JOINT
Filed Sept. 19, 1960 2 Sheets-Sheet 1
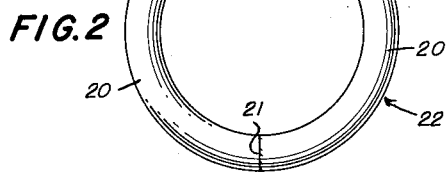
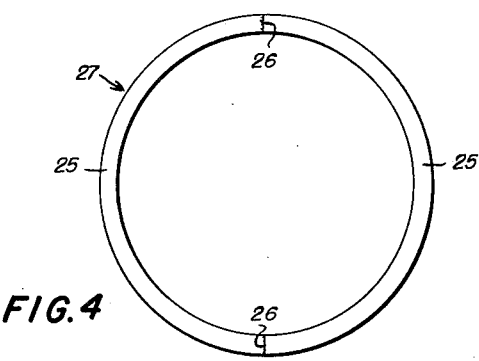
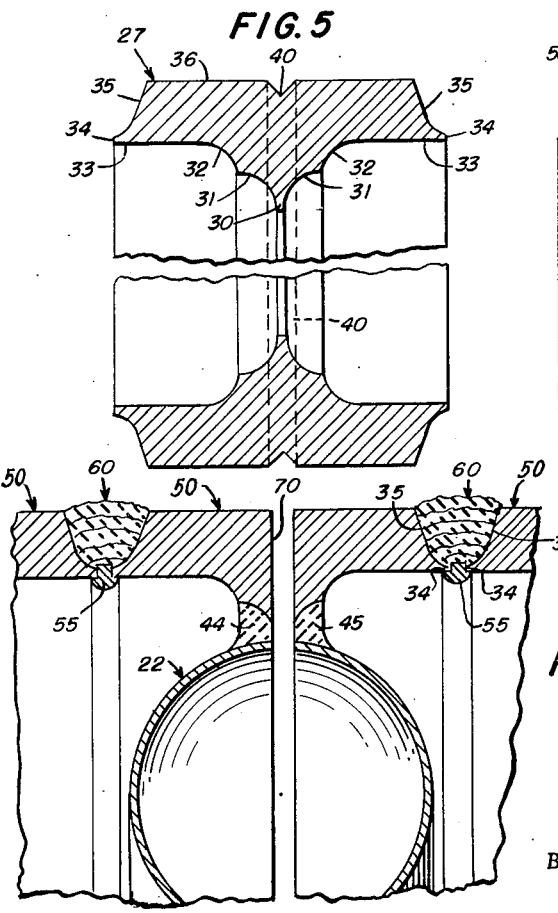
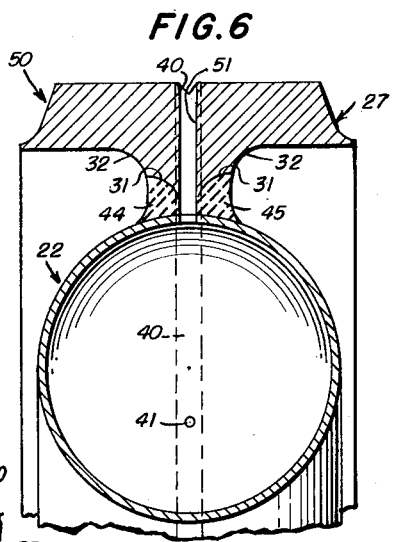
INVENTOR
LEONARD W. HURT
BY *Shoemaker and Mattare*
ATTORNEYS June 5, 1962 L. W. HURT 3,037,273
METHOD OF MAKING EXPANSION JOINT
Filed Sept. 19, 1960 2 Sheets-Sheet 2

INVENTOR
LEONARD W. HURT

BY *Shoemaker and Mattare*

ATTORNEYS

United States Patent Office 3,037,273
Patented June 5, 1962

3,037,273
METHOD OF MAKING EXPANSION JOINT
Leonard W. Hurt, Newport News, Va., assignor to Newport News Shipbuilding and Dry Dock Company, Newport News, Va., a corporation of Virginia
Filed Sept. 19, 1960, Ser. No. 56,957
14 Claims. (Cl. 29—454)

The present invention relates to a new and novel method of making an expansion joint assembly, and more particularly to a method of making an expansion joint which is particularly adapted to withstand high pressures exerted on the outer surface thereof while relative low pressures are exerted on the inner surface thereof.

Expansion joint assemblies made according to the present invention are especially adapted for use with submarines wherein the expansion joint may be utilized in the diesel exhaust piping structure. In such applications, the expansion joint assembly is subjected to relatively high external pressures when the submarine is submerged, and at the same time, the internal pressures within the expansion joint assembly are relatively low.

The method of making an expansion joint assembly of the present invention may be generally considered to be of the bellows type, which permits elongation and contraction of the expansion joint in a well-known manner. Conventional bellows-type expansion joints usually incorporate arcuate portions which bow out radially from the body of the bellows. This type of construction is unsatisfactory for use in the applications contemplated by the present invention since the high pressures exerted on the external portion of the expansion joint tend to collapse this type of conventional bellows expansion joints.

In contrast to the aforementioned conventional type of expansion joint construction, the present invention in corporates an arrangement wherein the arcuate bowed portions of the bellows-like expansion joint project radially inwardly of the assembly. With this type of construction, the high external pressure does not tend to collapse the bellows portion, but rather tends to hold the assembly in its operative position.

It will be apparent that under the relatively high pressures encountered at the great depths reached by modern submarines, the expansion joint assembly must be of heavy-duty construction, and accordingly, it is necessary to construct the expansion joint assembly of sturdy components, and yet at the same time the construction must be such as to provide sufficient flexibility and resiliency so that the expansion joint assembly can readily expand and contract in the desired manner.

The purposes of the present invention are accomplished by forming first members of a hollow substantially toroidal construction which are sufficiently flexible so as to permit deformation during operation. These first members are in turn rigidly attached to heavy second members which are not subject to deformation during operation. After so rigidly interconnecting the first and second members, suitable grooves are cut through portions of the first and second members to permit expansion and contraction thereof while at the same time maintaining a fluid-tight joint at all times.

The hollow toroidal members are disposed radially inwardly of the second heavy-duty members, and accordingly the overall joint presents a very sturdy and rugged arrangement since the relatively flexible bellows portion is disposed within and protected by the heavy-duty second members which define the outer periphery of the expansion joint assembly.

It is evident that in the construction of such a heavy-duty type assembly, the cost of fabrication and the time involved in constructing the expansion joint assembly are critical factors. The method of manufacture according to the present invention is particularly designed to reduce the cost of construction to a minimum by providing a method of manufacture which is quite simple and relatively easy to carry out in a minimum of time. Additionally, the method can be carried out inexpensively without the utilization of any specialized equipment. The entire expansion joint assembly is constructed of readily available components which are then machined and interconnected to provide the desired finished configuration.

The completed expansion joint assembly includes a tubular baffle means which extends through one end portion of the structure to a point spaced from the opposite end portion of the structure, the baffle means being disposed within and spaced from the toroidal members. This construction serves to provide a smoother gas flow through the apparatus and prevents turbulence about the toroidal members which otherwise would occur if the tubular baffle means were not present.

In addition, spacer means are provided to limit the contraction of the expansion joint such that it will not be damaged by a tendency to be excessively compressed. Drain means are also provided which communicate with the interior of the expansion joint assembly, these drain means of course being normally closed but permitting drainage of any liquid which may accumulate within the expansion joint assembly during operation.

An object of the present invention is to provide a method of manufacturing an expansion joint assembly which is adapted to maintain a fluid-tight seal and hold its shape when subjected to relatively high external pressures and relatively low internal pressures.

Another object of the invention is the provision of a method of manufacturing an expansion joint assembly which is quite simple and relatively easy to carry out in a minimum amount of time.

A further object of the invention is to provide a method of manufacturing an expansion joint assembly which can be carried out inexpensively without specialized equipment and which utilizes readily available components.

Other objects and many attendant advantages of the present invention will become more apparent when considered in connection with the specification and accompanying drawings, wherein:

FIG. 1 is a perspective view broken away of a component employed for forming a first member of the apparatus;

FIG. 2 illustrates a completed first member as employed in the structure;

FIG. 3 is a perspective view broken away of another component employed for making a second member of the completed apparatus;

FIG. 4 illustrates the second member as constructed of components as shown in FIG. 3;

FIG. 5 is a sectional view broken away of the second component shown in FIG. 4 after machining thereof;

FIG. 6 is a sectional view broken away illustrating the manner of attachment of the first member to the second member of the apparatus to form a ring-like assembly;

FIG. 7 is a sectional view broken away illustrating the manner in which adjacent ring-like assemblies are rigidly secured to one another;

Figure 8:
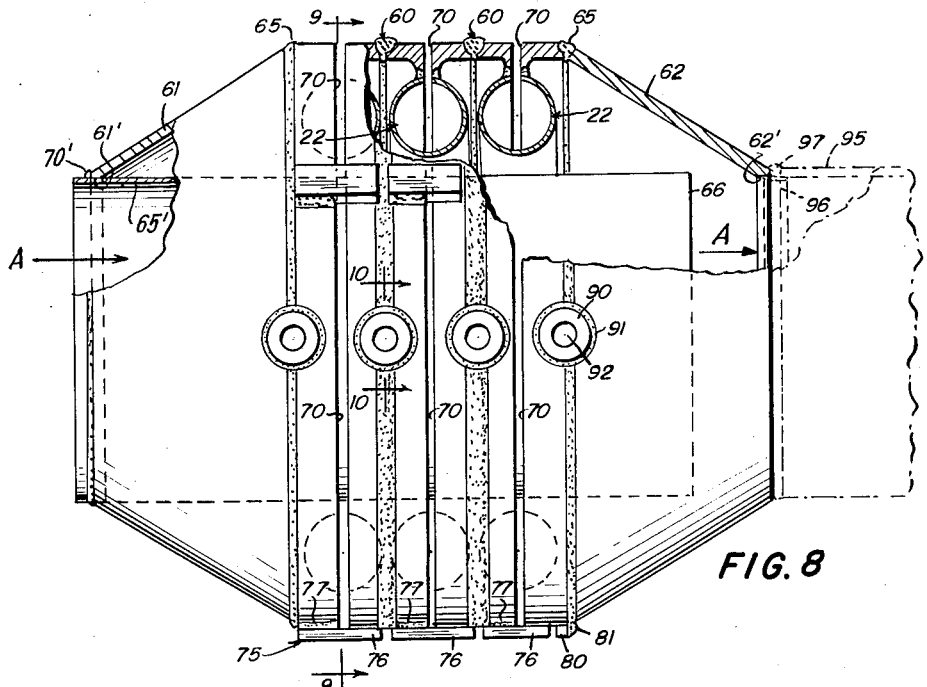
FIG. 8 is an elevation partly broken away and in section showing the completed expansion joint assembly according to the present invention.

Referring now to the drawings wherein like reference characters designate corresponding parts throughout the several views, there is shown in FIG. 1 an elongated hollow cylindrical member 20 formed of steel tubing or the like which in a typical example may have an outer diameter of 2.375 inches and a thickness of .109 inch to provide a finished member which is adapted to flex during operation. A plurality of tubular members 20 of similar construction and dimension are provided, each of the tubular members being then bent in a conventional manner into a semi-circular configuration.

As seen in FIG. 2, two similar semi-circular tubular members 20 are disposed in end-to-end relationship with one another, and these two semi-circular portions are then welded together along lines 21 to provide a finished first member which is illustrated generally by reference numeral 22, the first member comprising a generally toroidal shaped member which is hollow.

As seen in FIG. 3, a component 25 of a second member is illustrated, member 25 having a substantially rectangular cross-sectional configuration and being formed of relatively heavy-duty steel which in a typical example may have a thickness of 1⅜ inches. A plurality of members 25 are provided and each of these members is formed into a substantially semi-circular configuration. As seen in FIG. 4, a pair of members 25 which have been formed into a semi-circular configuration have been disposed in end-to-end relationship and are then welded together along lines 26 to provide an annular member of substantially rectangular cross-section.

This completed second member is indicated generally by reference numeral 27. It will be understood that second member 27 may also be manufactured by other means. For example, member 27 may be constructed by cutting a cylindrical tube into sections, the cylindrical tube having the desired finished outer diameter and thickness. In this case, the tube would be cut in a radial direction to provide the desired finished width of the second member 27.

After suitably forming the second member 27, the member 27 is machined to a shape as shown in FIG. 5 by placing member 27 in a lathe and machining the piece in a conventional manner. As seen in FIG. 5, member 27 has a rather unusual finished configuration including a radially inwardly extending rib portion 30, the rib being defined by arcuate portions 31 at either side thereof, which in turn join with arcuate portions 32. Arcuate portions 32 in turn merge with longitudinally extending cylindrical surfaces 33 which extend to the outer edge portions 34 at opposite ends of the second member 27. Sloping tapered surfaces 35 connect the end edges 34 with the outer cylindrical surface 36 of the second member.

It will be noted that the machining of member 27 includes the formation of a groove 40 formed in the outer surface 36, this groove having a substantially V-shaped cross-sectional configuration and extending annularly completely around the second member 27. The purpose of groove 40 is to precisely locate the parting slots which are subsequently machined in the structure as will hereinafter more fully appear.

Prior to attaching the first member 22 to the second member 27, a small vent hole illustrated by reference numeral 41 in FIG. 6 is provided through the outer peripheral wall portion of each half of the first member 22. After so forming these vent holes, the first member 22 is disposed within the second member 27. It should be noted that the outer diameter of the first member 22 is such that it fits closely within the inner diameter of the circular openings defined by the radially inner surface of rib 30. It is apparent that when member 22 is so positioned adjacent to rib portion 30, the first and second members are in position to be rigidly attached to one another.

As seen in FIG. 6, the first member 22 is secured to the second member 27 by forming two annular bodies of weld indicated generally by reference numerals 44 and 45 between opposite side portions of the rib portion 30 of the member 27 and the adjacent outer periphery of the first member 22. As seen in FIG. 6, these annular bodies of weld fill the cavities defined between the surfaces 31 of the second member 27 and the outer peripheral surface of first member 22, the bodies of weld being so formed as to preferably lie flush with the adjacent arcuate portions 32 of the second member 27. It will be understood that the bodies of weld 44 and 45 extend completely around the inner periphery of member 27 and the outer periphery of member 22 thereby rigidly attaching the first and second members to one another. In forming welds 44 and 45, care should be taken not to plug the vent holes 41 formed in member 22 before the welding is essentially completed, thus permitting venting of the atmosphere within member 22 until the last possible moment during such welding procedure.

As seen in FIG. 6, the two rigidly attached members 22 and 27 define a ring-like assembly which is indicated in its overall entirety by reference numeral 50. A plurality of vent holes 51 which may for example be two in number disposed at opposite sides of the ring-like assembly are then formed through the ring-like assembly 50, these vent holes extending completely through the central portion of the second member 27 and the adjacent wall portion of the first member 22. These vent holes 51 may be formed at this stage in the manufacture or after securing a plurality of ring-like assemblies to one another, the formation of the vent holes 51 being essential before the hereinafter discussed heat-treatment step.

The description up to this time has been concerned with the manufacture of a ring-like assembly which forms one unit of the structure of the completed expansion joint assembly. It will be understood that any number of ring-like assemblies may be employed as the particular application demands, and that a large plurality of ring-like assemblies may be secured in edge-to-edge relationship with one another to form the completed assembly.

Referring now to FIG. 7, the manner of securing a plurality of ring-like assemblies to one another is illustrated. The end edges 34 of two ring-like assemblies 50 are disposed adjacent one another and slightly spaced therefrom. Between the annular space of these end edges is placed a consumable insert indicated by reference numerals 55. This consumable insert is formed of fusible material which is arc-welded in place and when welded in position, serves to fill up the bottom of a groove defined between the adjacent sloping surfaces 35 of the various ring-like assemblies. As seen in FIG. 7, these consumable inserts have a substantially T-shaped cross-sectional configuration with the enlarged heads thereof spanning the adjacent inner surfaces of the various ring-like assemblies.

After having welded the consumable insert in place, a body of weld 60 is built up between the adjacent sloping surfaces 35 of the two ring-like assemblies. This body of weld is built up by arc-welding successive beads one over the other until the space between the two sloping surfaces is filled by weld thereby defining a circumferentially extending annular weld which rigidly attaches the ring-like assemblies to one another in side-by-side relationship. It is evident that a body of weld 60 will be formed between each adjacent pair of ring-like assemblies.

Referring to FIG. 8, it will be noted that a first end member 61 is provided at one end of the assembly and a second end member 62 is provided at the opposite end of the assembly. Each of these end members 61 and 62 has an outer configuration defining a truncated cone, the two members being provided with central openings 61′ and 62′ formed at the outer end portions thereof. The two end members 61 and 62 are connected at the adjacent end edges of the ring-like assemblies formed at opposite ends of the bellows portions of the structure in the same manner as the end edges shown in various ring-like assemblies are connected to one another. In other words, a consumable insert is first welded in position between the opposite end edge portions of the ring-like assemblies, and then arc-welded in place. A body of weld 65 is then built up between the opposite ends of the bellows portion of the structure and the end members 61 and 62 by forming successive beads of weld as discussed previously. In this manner, the end members 61 and 62 are rigidly secured to opposite ends of the structure. In addition, a tubular baffle member 65' is inserted through the central opening 61' provided in the end portion 61, cylindrical baffle 65' terminating at a point 66 spaced from the adjacent end member 62, the end portion of cylindrical baffle 65' being open thereby permitting the passage of gas through the cylindrical baffle as indicated by arrows A in FIG. 8 in such a manner that the flow of gas will be smooth and will not impinge upon the flow around the toroidal members 22. Tubular baffle 65' is welded in place by a weld 70' to the outer end portion of end member 61, weld 70' extending completely around the outer periphery of baffle member 65'. In order to facilitate installation of the cylindrical baffle 65' in place, it may be welded to end member 61 prior to the welding of end member 62 in operative position as shown.

As a further modification of the baffle arrangement shown in FIG. 8, the baffle 65' may have a reduced diameter at the outer end 66 thereof, and a second baffle may extend from the end member 62 adjacent the openings 62' therein toward and in surrounding relationship to the end portion 66 of the baffle member 65'. Such baffle members would be in sliding telescoping relationship to one another which would permit telescoping movement when the joint is subject to axial movement only. This, of course, ensures that no gas whatsoever could escape into the space between the tubular baffle member 65' and the outer portion of the joint as seen in FIG. 8. As a further modification, the tubular baffle member may have a venturi shape in cases where the outside diameter of the joint is limited.

After the welding operation is completed, the entire assembly is heat-treated to remove the stresses therein, such heat-treating step being accomplished in a conventional manner to anneal the metal of the assembly. To enable such annealing, the vent holes 51 formed in each of the ring-like assemblies permit the atmosphere within the toroidal members to be exhausted.

After heat-treating the assembly, slots 70 as seen in FIGS. 7 and 8 are machined in the ring-like assemblies, these slots 70 extending completely around the periphery of the first and second members of each ring-like assembly and extending completely through the second member 27 of each ring-like assembly and through the adjacent wall portion of the associated first member 22. These slots are machined using the aforementioned grooves 40 as a guide. It is evident that upon formation of grooves 70, an expandible and contractible arrangement is provided which permits expansion and contraction of the assembly by deformation of the toroidal first members 22 as will be well understood, while at the same time maintaining an effective fluid-tight seal at all times.

Figure 9:
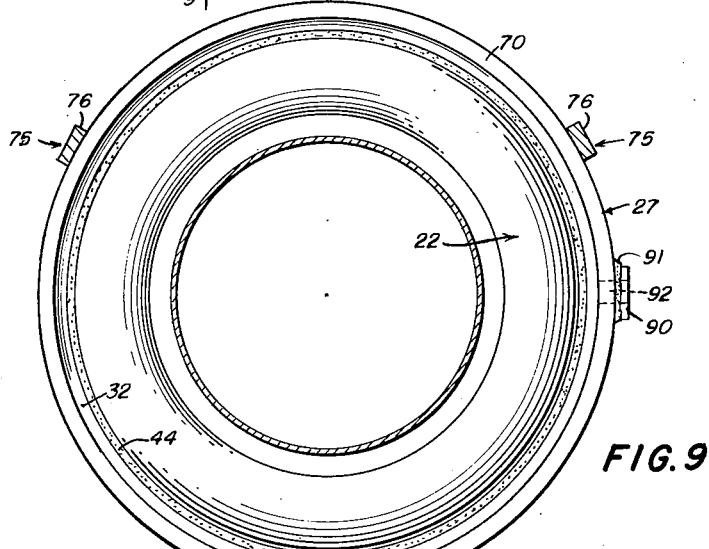
FIG. 9 is a sectional view taken along line 9—9 of FIG. 8 looking in the direction of the arrows.

In order to limit the collapsing movement of the expansion joint assembly, three sets of spacer members are provided disposed 120° apart about the outer periphery of the expansion joint assembly. The position of the three sets of spacer members may be seen most clearly in FIG. 9, the various sets of spacers each being indicated by reference numerals 75.

Referring now to FIG. 8, wherein the assembly is shown as comprising three ring-like assemblies, it will be noted that each group of spacer members 75 includes three spacer members 76 which comprise flat strips of rigid material such as steel or the like. Each of flat spacer members 76 is welded as at 77 to a portion of the outer periphery of the associated ring-like assembly disposed at one side of slot 70 therein while the remainder of the spacer members 76 overlaps that portion of the same ring-like assembly disposed on the other side of the slot 70 therein. The overlapping portion of each of spacer members 76 may contact the outer peripheral portion which it overlies. It will be also noted that a small stop member 80 is rigidly attached as by a weld 81 to the outer periphery of the right-hand most ring-like assembly as seen in FIG. 8 in each of the spacer assemblies 75.

It will be apparent that the spacer members 76 and stop member 80 will effectively limit the degree to which the various ring-like assemblies may be compressed, the spacing between adjacent spacers being preferably less than the width of the slot 70 to prevent the slot 70 from being completely closed at the limit of movement of the assembly in a compressing direction. In addition, the spacer members 76 serve to resist lateral displacement of the ring-like assemblies with respect to one another, and accordingly, the spacer members serve to provide greater lateral strength for the overall expansion joint assembly.

As mentioned previously, it is also desirable to provide drain means which is in communication with the interior of the expansion joint assembly. This is accomplished by first attaching as by welding a substantially cylindrical boss to the outer periphery of said ring-like assembly. As seen in FIG. 8, four such bosses 90 are shown as being welded to the outer surface of the structure by annular weldments 91, it being noted that each of said bosses is mounted on the heavy-duty second members, and as shown, these bosses are centered about the annular weld portions 60 and 65.

Figure 10:
FIG. 10 is a sectional view taken along line 10—10 of FIG. 8 looking in the direction of the arrows.

After welding these cylindrical bosses in such position, holes 92 are drilled completely through the bosses and the adjacent walls of the second members 27. These openings may be most clearly seen in FIG. 10, whereby it is apparent that the openings 92 provide drain holes for the expansion joint assembly. It is apparent that suitable drain plug means will be provided for closing the drain openings 92 during operation of the apparatus.

Referring again to FIG. 8, the manner of assembling the apparatus is indicated where, for example, the outlet end portion 62 of the expansion joint assembly may be connected to a pipe 95 leading to the exhaust portion of the system. The outer end portion of end member 62 may be suitably connected to the pipe 95 by first securing a backing ring 96 in position as shown in the end opening 62' and then securing the backing ring to the pipe 95 as by welding and the like, and subsequently filling the space defined between members 62 and 95 with an annular weld body 97 for permanently attaching the expansion joint assembly to the outlet pipe 95. It will, of course, be understood that the opposite end portion of the expansion joint assembly may be connected in a similar manner to another pipe, the outwardly extending portion of tubular baffle member 65' serving as a backing-up ring in such a case.

It is apparent from the foregoing that there is provided a new and novel method of forming an expansion joint assembly which is especially adapted to hold its shape and maintain a fluid-tight seal when subjected to high external pressures and relatively low internal pressures. The method is quite simple and relatively easy to carry out in a minimum amount of time. In addition, the method can be carried out inexpensively without specialized equipment and utilizing conventional readily available components.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. The method of manufacturing an expansion joint assembly comprising providing a hollow generally toroidal shaped resilient first member, providing an annular rigid second member having an inner and an outer periphery, securing the outer periphery of said first member to the inner periphery of said second member such that said first member is disposed inwardly of said second member to form a ring-like assembly, attaching a plurality of said ring-like assemblies in side-by-side relationship to one another, and forming slots through each of said ring-like assemblies, each of said slots extending completely around the periphery of said first and second members of each ring-like assembly and extending completely through the said second member of each ring-like assembly and through the adjacent wall portion of the associated said first member.

2. The method of manufacturing an expansion joint assembly comprising providing a hollow resilient first member having the general configuration of a tore, providing an annular rigid second member having an inner and an outer periphery, machining said second member to its finished shape and including a radially inwardly extending rib portion, welding the outer periphery of said first member to the inner periphery of said second member at said rib such that said first member is disposed inwardly of said second member to form a ring-like assembly, and machining a slot through said ring-like assembly, said slot extending completely around the periphery of said first and second members and extending completely through the said first member and through the adjacent wall portion of the said first member.

3. The method of manufacturing an expansion joint assembly comprising providing a first resilient hollow member of substantially annular configuration, providing a second rigid member of annular configuration, welding the outer periphery of said first member to the inner periphery of said second member such that said first member is disposed inwardly of said second member to form a ring-like assembly, forming another ring-like assembly in the same manner as the first-mentioned ring-like assembly, welding the edge portions of one ring-like assembly to the other ring-like assembly, heat-treating the welded structure to relieve the stresses therein, and then machining slots through each of said ring-like assemblies, each of said slots extending completely around the periphery of said first and second members of each ring-like assembly and extending completely through the said second member of each ring-like assembly and through the adjacent wall portion of the associated said first member.

4. The method as defined in claim 3, including the additional step of inserting a tubular baffle within and spaced from the inner peripheries of said first members.

5. The method as defined in claim 3, including the additional step of attaching spacer members to the outer peripheries of said second members, said spacer members each being connected to one portion of said second members disposed on one side of the slot formed in the associated second member and overlapping a portion of the associated second member disposed on the other side of the slot in the associated second member.

6. The method as defined in claim 3, including the additional steps of attaching bosses to the outer peripheries of said ring-like assemblies, and then drilling a hole through each of said bosses and the associated ring-like assemblies.

7. The method of manufacturing an expansion joint assembly comprising providing a first resilient hollow member of generally annular configuration, providing a second rigid member of generally annular configuration, machining said second member to its finished shape including a radially inwardly extending rib portion, welding the outer periphery of said first member to the inner periphery of said second member such that said first member is disposed inwardly of said second member at said rib portion to form a ring-like assembly, placing a plurality of ring-like assemblies in edge-to-edge relationship with one another, welding the adjacent edges of said ring-like assemblies to one another, providing vent openings through the walls of said first and second members, heat-treating the assemblies to relieve the stresses therein, and machining slots through each of said ring-like assemblies, each of said slots extending completely around the periphery of said first and second members of each ring-like assembly and extending completely through the said second member of each ring-like assembly and through the adjacent wall portion of the associated said first member.

8. The method as defined in claim 7, including the additional steps of adding end members to opposite end portions of the interconnected ring-like assemblies, and inserting a tubular baffle member through one of said end members, said tubular baffle extending within and spaced from the inner peripheries of said first members of all of said ring-like assemblies.

9. The method as defined in claim 8, including the additional step of attaching spacer members to said ring-like assemblies, each of said spacer members being secured to the portion of the second member of the associated ring-like member disposed on one side of the slot formed therethrough, and overlying the portion of the second member disposed on the opposite side of the slot.

10. The method as defined in claim 7, including the additional steps of welding bosses to the outer peripheries of said ring-like assemblies and drilling holes through each of said bosses and the associated ring-like assemblies.

11. The method of manufacturing an expansion joint assembly, comprising providing a first resilient hollow member having a generally toroidal configuration, providing a second rigid annular member, machining said second member to a final shape including a radially inwardly extending rib portion, forming at least one vent hole through the wall of said first member, welding the outer periphery of said first member to the inner periphery of said second member adjacent said rib portion such that said first member is disposed inwardly of said second member to form a ring-like assembly, welding a plurality of said ring-like assemblies to one another along the edge portions thereof to form a structure, forming vent holes through each of said second members and the adjacent wall of the associated first members, heat-treating said structure to relieve the stresses therein, machining slots through each of said ring-like assemblies, each of said slots extending completely around the periphery of said first and second members of each ring-like assembly and extending completely through the said first member of each ring assembly and through the adjacent wall portion of the associated said first member, attaching an end member to opposite end portions of said structure, each of said end members having a central opening formed therethrough, inserting a tubular baffle through the opening in one of said end portions to a point such that the end of said tubular baffle is spaced from the opposite end member with the outer periphery of said tubular member within and spaced from the inner periphery of each of said first members, and securing said tubular baffle in place.

12. The method as defined in claim 11, including the additional step of attaching spacer members to said ring-like assemblies, each of said spacer members being secured to the portion of the second member of the associated ring-like member disposed on one side of the slot formed therethrough, and overlying the portion of the second member disposed on the opposite side of the slot.

13. The method as defined in claim 11, including the additional steps of welding bosses to the outer peripheries of said ring-like assemblies and drilling holes through each of said bosses and the associated ring-like assemblies.

14. The method of manufacturing an expansion joint assembly, comprising forming a plurality of resilient tubular members having a generally semi-circular configuration, securing the opposite end portions of two of said tubular members to one another to form a first resilient member, forming a vent hole in each half of said first member, forming a second rigid member having a generally annular configuration and having a generally rectangular cross-sectional configuration, machining said second member to a final shape including a radially inwardly extending rib portion, welding the outer periphery of said first member to the inner periphery of said second member at said rib portion such that said first member is disposed inwardly of said second member to form a ring-like assembly, forming another ring-like assembly similar to said first-mentioned ring-like assembly, placing said ring-like assemblies in side-by-side relationship to one another with the side edges of said second members adjacent to one another, placing a consumable insert between said adjacent edge portions, welding said insert in place, building up a body of weld between said adjacent edges, forming vent holes through each of said second members and the adjacent walls of the associated first members, heat-treating the entire structure to relieve the stresses therein, forming slots through each of said ring-like assemblies, each of said slots extending completely around the periphery of said first and second members of each ring-like assembly and extending completely through the said second member of each ring-like assembly and through the adjacent wall portion of the associated said first member, attaching end members to opposite end portions of the interconnected ring-like assemblies, inserting and securing a cylindrical baffle in position extending through one of said end members, spaced from the opposite end member and extending through and spaced from the inner peripheries of each of said first members, attaching spacer members to the outer surfaces of said ring-like assemblies to limit the collapsing movement of the expansion joint assembly, and providing drains through each of said ring-like assemblies.

References Cited in the file of this patent

UNITED STATES PATENTS 2,344,269     Saco ------------------ Mar. 14, 1944

FOREIGN PATENTS 1,069,438     Germany -------------- Nov. 19, 1959